US008028279B2

(12) United States Patent
Bonsteel et al.

(10) Patent No.: US 8,028,279 B2
(45) Date of Patent: Sep. 27, 2011

(54) SYSTEM AND PROGRAM PRODUCT FOR PORTING CODE UTILIZING A PORTABLE EXECUTION ENVIRONMENT

(75) Inventors: Roger E. Bonsteel, Kingston, NY (US); Juliet C. Candee, Brewster, NY (US); John L. Czukkermann, Lagrangeville, NY (US); David B. Emmes, Wappinger Falls, NY (US); Steven J. Greenspan, Poughkeepsie, NY (US); Joshua W. Knight, III, Mohegan Lake, NY (US); Alan M. Webb, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 12/028,134

(22) Filed: Feb. 8, 2008

(65) Prior Publication Data
US 2008/0155516 A1 Jun. 26, 2008

Related U.S. Application Data

(63) Continuation of application No. 10/947,928, filed on Sep. 23, 2004, now Pat. No. 7,356,808.

(51) Int. Cl.
*G06F 9/45* (2006.01)
(52) U.S. Cl. ........................................... 717/138
(58) Field of Classification Search .................. 717/122, 717/136, 137, 138, 139, 162, 168, 170
See application file for complete search history.

(56) References Cited

U.S. PATENT DOCUMENTS

| 5,636,371 | A | 6/1997 | Yu |
| 6,286,134 | B1 | 9/2001 | Click et al. |
| 6,611,884 | B2 | 8/2003 | Castellano |
| 6,810,517 | B2 | 10/2004 | Bond et al. |
| 6,941,547 | B2 | 9/2005 | Duran |
| 2002/0138821 | A1 | 9/2002 | Furman et al. |
| 2003/0115578 | A1 | 6/2003 | Liokumovich et al. |
| 2004/0034455 | A1 | 2/2004 | Simonds et al. |
| 2004/0078781 | A1 | 4/2004 | Novy et al. |
| 2004/0205754 | A1 | 10/2004 | Gazda et al. |
| 2005/0071824 | A1 | 3/2005 | K. N. et al. |

FOREIGN PATENT DOCUMENTS
WO  WO 02/097552 A2  12/2002

*Primary Examiner* — Anna Deng
*Assistant Examiner* — Matthew J Brophy
(74) *Attorney, Agent, or Firm* — Dennis Jung, Esq.; Kevin P. Radigan, Esq.; Heslin Rothenberg Farley & Mesiti P.C.

(57) ABSTRACT

A system for porting code from a native platform to a non-native platform is provided which utilizes a non-native, platform-specific layer of code and a platform-neutral layer of code. The platform-neutral layer substantially emulates the native platform of ported code and provides a platform-neutral interface to the ported code. Together, the platform-specific layer and the platform-neutral layer provide an execution environment in which the ported code operates as a kernel extension of the non-native platform. The platform-neutral layer of the execution environment is portable to other non-native platforms so that code can be ported to another non-native platform by replacing the platform-specific layer with a customized platform-specific layer, which is adapted to the other non-native platform.

20 Claims, 16 Drawing Sheets

SYSTEM AND PROGRAM PRODUCT FOR PORTING CODE UTILIZING A PORTABLE EXECUTION ENVIRONMENT

CROSS-REFERENCE TO RELATED APPLICATION

This application is a continuation of U.S. patent application Ser. No. 10/947,928, filed Sep. 23, 2004, and entitled "Method, System, and Program Product for Porting Code Utilizing a Portable Execution Environment," and which was published on Mar. 23, 2006 as U.S. Patent Publication No. US 2006/0064683 A1, and which is assigned to the same assignee as this application, and which is hereby incorporated herein by reference in its entirety.

TECHNICAL FIELD

This invention relates in general to porting code to a non-native computing platform, and more particularly, to a technique for porting code from its native platform to a non-native platform utilizing a layered, portable execution environment.

BACKGROUND OF THE INVENTION

Various operating systems for computing environments use different approaches for managing input-output functionality from and to external devices. For example, in UNIX-like and Windows NT operating systems, input-output functionality is managed by the operating system through device drivers, which are operating system extensions commonly written in the C programming language. Generally, these device drivers understand and control one type of device, such as a SCSI disk, a CD-ROM device, or an adapter card. It is quite common for a manufacturer of such an external device to provide device drivers that have been optimized for its own particular device. Disadvantageously, it is often necessary to rewrite portions of a device driver to port the device driver to a different operating system so that the external device can be used in a different computing environment.

Since rewriting device driver code can be time-consuming and expensive, there is an incentive for device manufacturers to provide device drivers for the more popular operating systems first. Thus, computing systems running other operating systems may not be able to utilize new external devices that become available, or the ability to utilize new external devices in such computing systems may be delayed by the time required to rewrite the drivers for these new external devices.

One solution to this problem is the Uniform Driver Interface (UDI), which provides a platform-neutral interface between a computer's operating system and a device driver which is written in compliance with the UDI standard. This solution has the disadvantage however that it only makes newly written device drivers, which are written in compliance with the UDI standard, portable. This approach does not facilitate porting an existing device driver from its native operating system to another operating system. Therefore, there remains a need for a technique of porting existing device drivers from their native operating systems to other operating systems without having to rewrite each ported device driver.

SUMMARY OF THE INVENTION

In one aspect, the shortcomings of the prior art are overcome and additional advantages are provided through the provision of a method of porting code from a native platform to a non-native platform. The method of porting code comprises providing a non-native, platform-specific layer and a platform-neutral layer. The platform-neutral layer substantially emulates the native platform of ported code and provides the non-native, platform-specific layer with a platform-neutral interface to the ported code. Together, the non-native, platform-specific layer and the platform-neutral layer provide an execution environment for facilitating execution of the ported code on the non-native platform. The ported code operates as a kernel extension of the non-native platform.

In another aspect of the present invention, the platform-neutral layer of the execution environment is portable to other non-native platforms to facilitate porting code to multiple non-native platforms. Code is ported to another non-native platform by replacing the platform specific layer with a customized platform-specific layer, wherein the customized platform-specific layer is adapted to the other non-native platform.

In a further aspect, the method of porting code further comprises constructing an execution environment for porting code from the native platform to the non-native platform. The construction of the execution environment includes instantiating the execution environment having a non-native, platform-specific layer and a platform-neutral layer, which initially includes a platform-neutral core services component and a primary component, and dynamically loading additional components of the platform-neutral layer as required to satisfy requests for services provided by the additional components.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, the present invention is a method, system, and program product for porting code from its native platform to one or more non-native platforms via a portable, layered execution environment. Advantageously, this execution environment facilitates running ported code as a kernel extension of a non-native platform. This feature enables the porting of code such as a device driver, for example, from a native platform for which it was written to a non-native platform. (As used herein, the term "platform" encompasses the operating system software for a computing system and can also include the configuration of configurable operating system features and the underlying processor hardware.) Since the execution environment has a layered structure, code ported to one non-native platform can be moved to another non-native platform by providing a replacement platform-specific layer, which is tailored for the new target non-native platform, for the execution environment. The platform-neutral layer of the execution environment is ported to the new target non-native platform unchanged along with the ported code. This advantageously reduces the amount of code that must be developed to utilize devices with more than one type of platform. In another aspect of the present invention, the platform-neutral layer accommodates having multiple personality components loaded concurrently so that code modules which are ported from different native platforms can run concurrently on a non-native platform.

Figure 1:
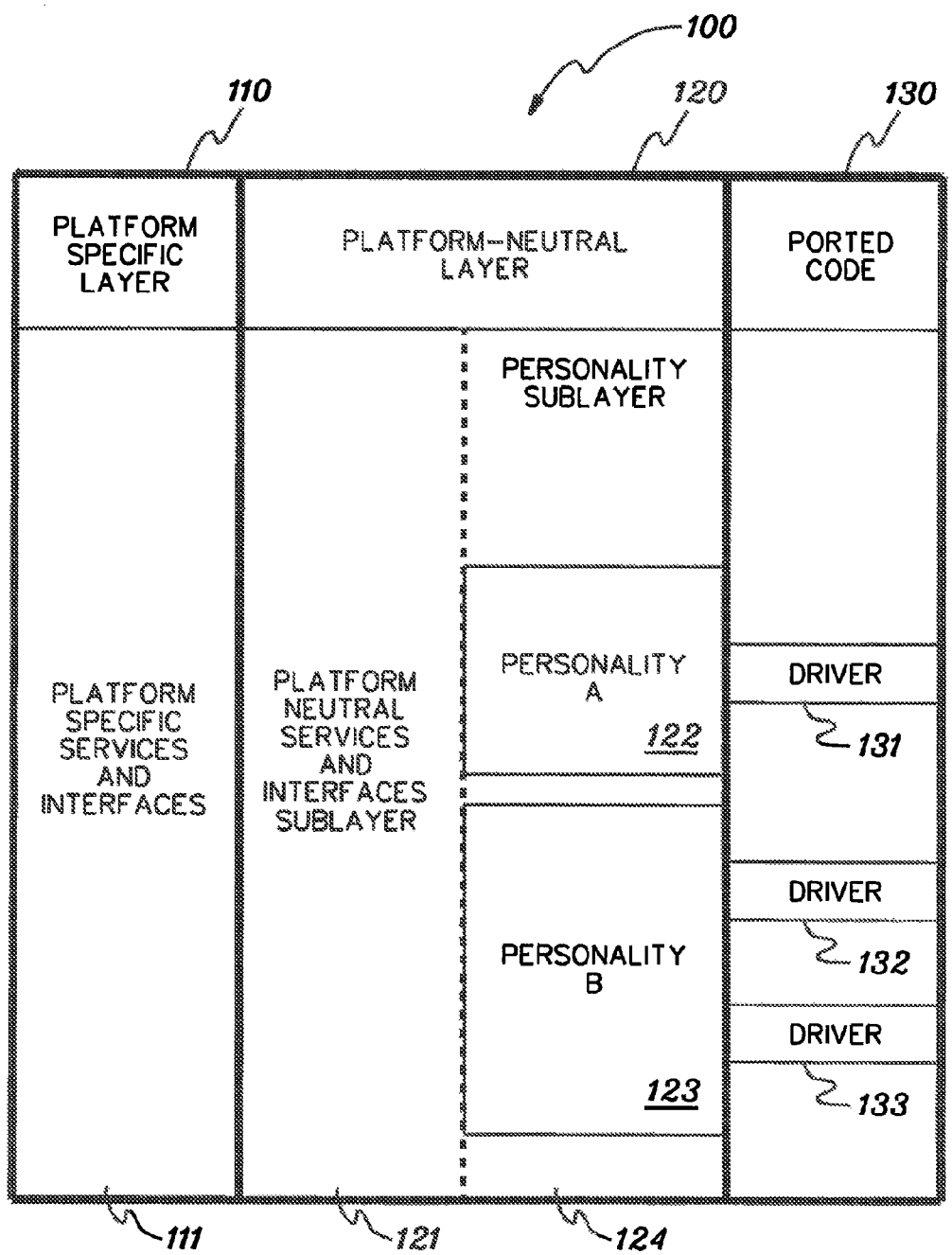
FIG. 1 illustrates one embodiment of an execution environment for porting code from a native platform to a non-native platform, in accordance with an aspect of the present invention.

One embodiment of the basic structure 100 of an execution environment for porting code from a native platform to a non-native platform, in accordance with an aspect of the present invention, is illustrated in FIG. 1. The basic structure 100 of the execution environment for porting code comprises a platform-specific layer 110, a platform-neutral layer 120, and a ported code layer 130. The platform-specific layer 110 provides platform-specific services and interfaces 111. That is, the platform-specific layer 110 provides interfaces between the platform neutral layer 120 and the non-native platform; the platform-specific layer 110 also provides services derived from services of the non-native platform which can be accessed by the platform-neutral layer 120. The platform-neutral layer 120 comprises two sublayers: a platform-neutral services and interfaces sublayer 121 and a personality sublayer 124, which includes personality component A 122 and personality component B 123 in the example shown in FIG. 1. The platform-neutral services and interfaces sublayer 121 defines the basic services which are available to components of the platform-neutral layer and provides an interface between the platform-specific layer 110 and personality sublayer 124. Personality sublayer 124 provides translation between the common, basic services of the platform-neutral services and interfaces sublayer 121 and the services expected by the ported code layer 130. As illustrated in the example shown in FIG. 1, the personality layer may have more than one personality component. For example, personality component A 122 can be an AIX® personality component, and personality component B 123 can be a Linux component. (AIX® is a registered trademark of International Business Machines Corporation.) Each personality component emulates the execution environment of a native platform (or operating system) from which code is ported. The ported code layer 130 comprises one or more modules of ported code, which interface to a personality of the personality sublayer 124. In the example shown in FIG. 1, ported code layer 130 comprises device drivers 131, 132, and 133.

Figure 2:
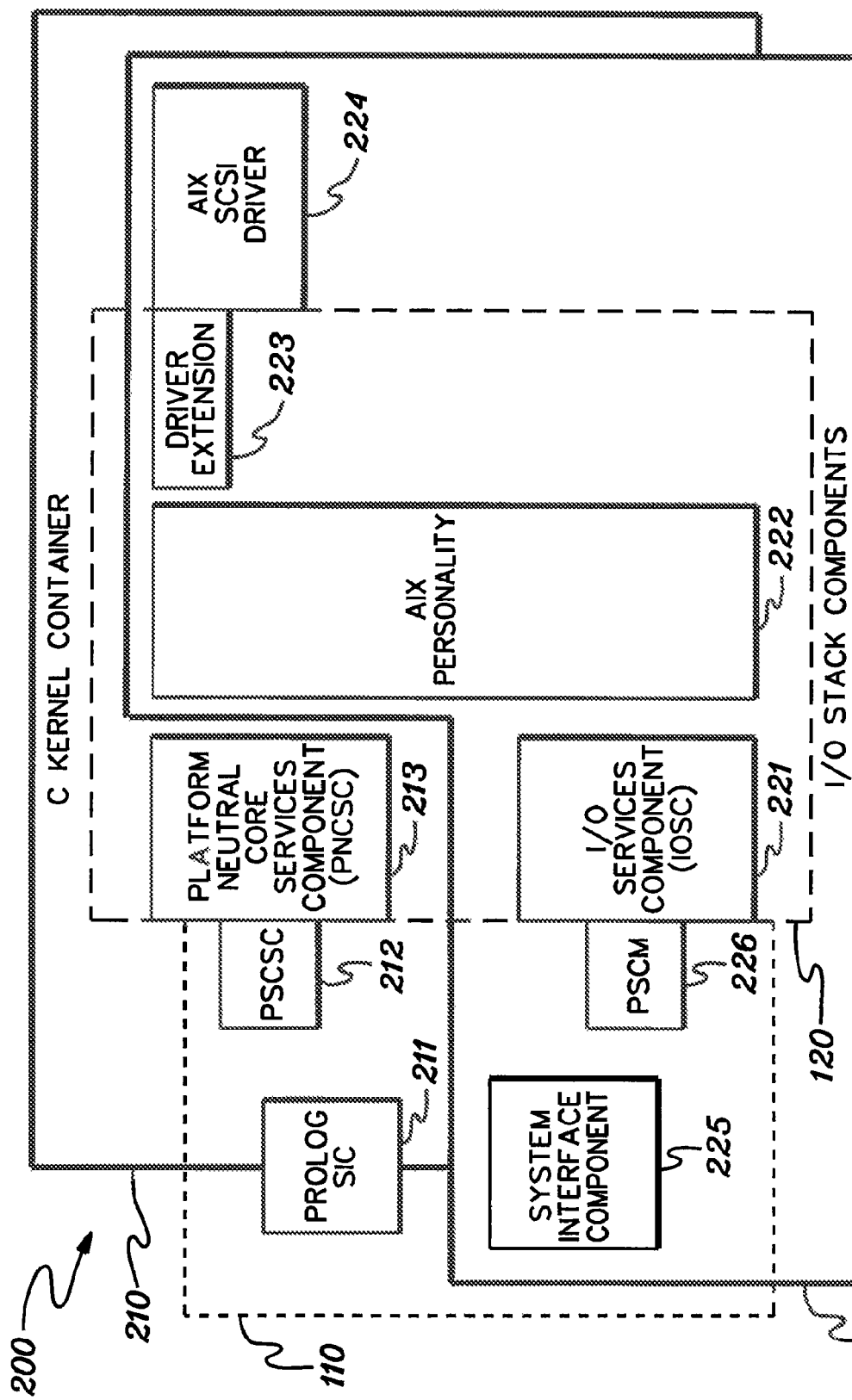
FIG. 2 illustrates the components comprising an embodiment of an execution environment for porting code from a native AIX® or UNIX platform to another non-native platform, in accordance with an aspect of the present invention.

FIG. 2 illustrates the components comprising an embodiment of an execution environment 200 for porting code from a native AIX® or UNIX platform to another non-native platform in accordance with an aspect of the present invention. In this example, the ported code is an AIX® SCSI driver 224. The basic structure of this embodiment is described first, and then, the functions and interactions of the components shown in FIG. 2 are described below.

In the embodiment illustrated in FIG. 2, the platform-specific layer 110 comprises a prolog system interface component 211, a platform-specific core services component 212, a system interface component 225, and a platform-specific configuration management component 226. The platform-neutral layer 120 comprises a platform-neutral core services component 213, input-output services component 221, AIX personality component 222, and driver extension component 223. The platform-neutral core services component (PNCSC) 213 and input-output services component (IOSC) 221 are included in the platform-neutral layer's platform-neutral services and interfaces sublayer 121 of FIG. 1.

In accordance with an aspect of the present invention, the prolog system interface component 211 and platform-specific core services component 212 of the platform-specific layer 110 and the PNCSC 213 of the platform-neutral layer 120 form a C-kernel container 210 in which other components of the platform-neutral layer 120 of the execution environment for porting code can execute. The remaining components illustrated in FIG. 2 form an input-output stack 220, which facilitates input-output operations between a device managed by AIX SCSI driver 224 (the ported code) and a non-native platform. The components of input-output stack 220 include the following: system interface component 225 and platform-specific configuration management component 226 of platform-specific layer 110; input-output services component 221, AIX personality component 222, and driver extension component 223 of platform-neutral layer 120; and AIX SCSI driver 224.

The functions of the components illustrated in FIG. 2 and their interactions are summarized briefly below. The prolog system interface component 211 is called by the non-native platform to instantiate the C-kernel container 210. (Note that the term "native platform", as used herein, refers to the native platform of the code being ported, and the term "non-native platform", as used herein, refers to a platform to which the code is being ported. For clarity, it should also be noted that, while the term non-native platform is used to identify the platform to which code such as a device driver is ported, functionally what is named non-native platform herein is, however, the native platform of the platform-specific layer's components.) The platform-specific core services component (PSCSC) 212 and platform-neutral core services component (PNCSC) 213 are also called during instantiation of the C-kernel container. The PNCSC 213 defines common services available to all other components of the platform-neutral layer. The PSCSC 212 provides basic services, which are characteristic of operating systems in general but cannot be implemented directly in the platform-neutral layer. The components of the platform-neutral layer access the services of the PSCSC 212 via an interface provided by the PNCSC 213. Together, the platform-specific core services component (PSCSC) 212 and platform-neutral core services component (PNCSC) 213 provide an interface between the non-native platform and the other components of the platform-neutral layer through which the components of the platform-neutral layer access the services of the non-native platform.

In the input-output stack 220, input-output services component 221 is a primary component, which is also loaded and called during instantiation of the C-kernel container. The input-output services component 221 defines the platform neutral layer's input-output interfaces to platform-specific layer 110, routes input-output requests from system interface component 225 to AIX personality component 222, and defines the platform-neutral layer's interfaces to platform-specific configuration management component 226.

System interface component 225 provides interfaces between the non-native platform and the primary components of the platform neutral layer 120. In the example illustrated in FIG. 2, the primary component to which system interface component 225 interfaces is input-output services component (IOSC) 221. Platform-specific configuration management (PSCM) component 226 provides the platform-neutral layer 120 with access to the non-native platform's logical configuration repository via IOSC 221.

Generally, a personality component such as AIX personality component 222 translates between the common, basic services provided by the platform-neutral services and interfaces sublayer and the services expected by the ported code, AIX SCSI driver 224 in the example illustrated in FIG. 2, from its native platform. Thus, AIX personality component 222 emulates AIX services expected by AIX SCSI driver 224 and provides an interface between the platform-neutral services and interfaces sublayer 121 of FIG. 1 and the AIX SCSI driver 224.

In the exemplary embodiment of FIG. 2, AIX SCSI driver 224 is a code module that is being ported from its native AIX platform to a non-native platform. Driver extension 223 is essentially glue code. That is, driver extension 223 provides ported-code-module-specific functionality that is necessary for AIX SCSI driver 224 to execute in the environment provided by the platform-neutral layer but not present in AIX SCSI driver 224. For example, driver extension 223 provides interfaces to AIX SCSI driver 224 that are required of all components which operate in container 210, handles configuration of AIX SCSI driver 224, and provides the dynamic load library capability for AIX SCSI driver 224.

In another aspect of the present invention, control areas in memory are used to convey information between the components of the layered execution environment for porting code. These control areas are tables in which data and pointers to other data are stored. The data and pointers to other data stored in the control areas are used by the components of the execution environment to determine the subsequent component to call when making a request for a service provided by another component in the execution environment.

Figure 3:
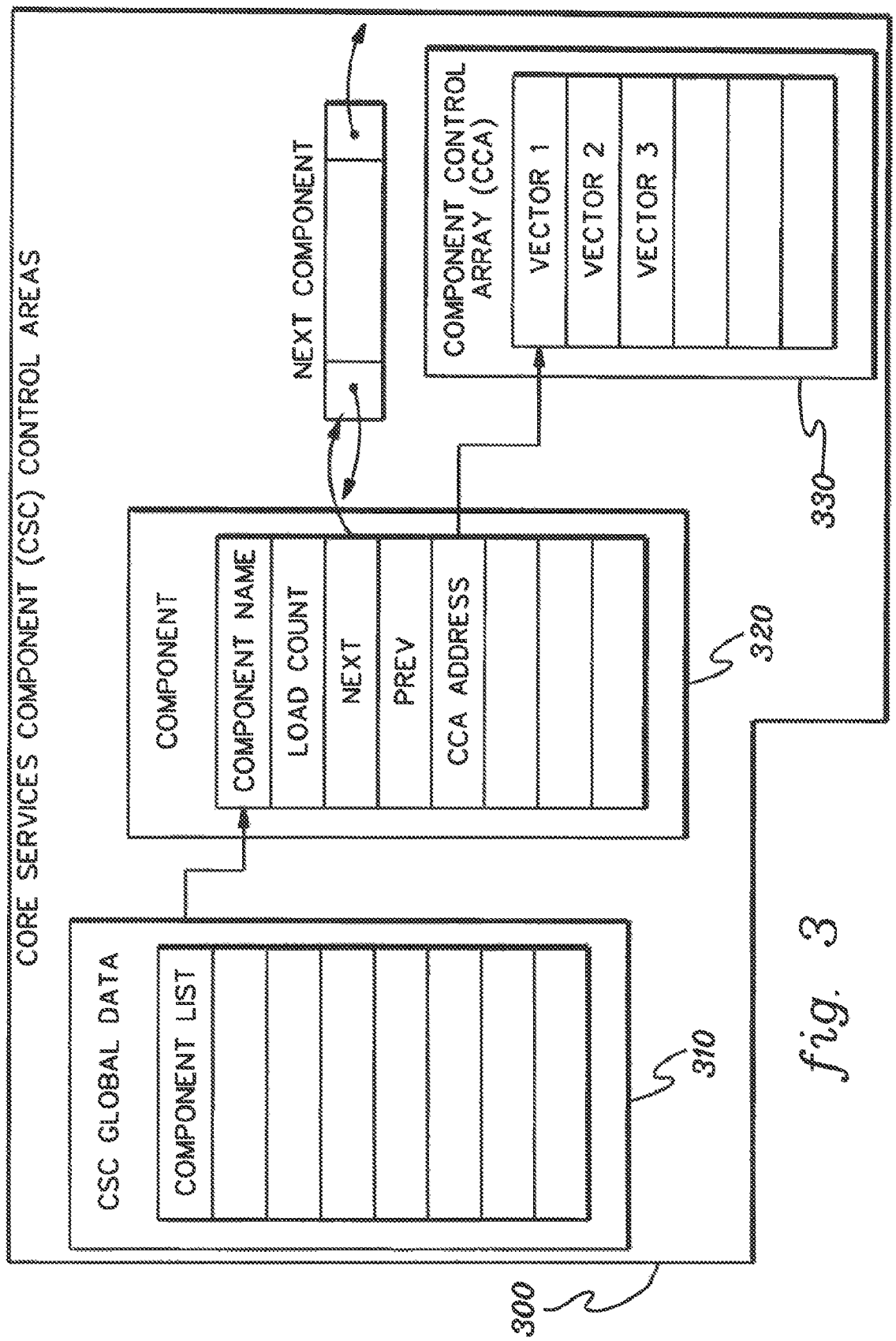
FIG. 3 illustrates one embodiment of the core services control areas, in accordance with an aspect of the present invention.

FIG. 3 illustrates one embodiment of the core services component control areas 300. The core services component (CSC) control areas include CSC global data control area 310, component control area 320 and component control array (CCA) control area 330. Component control area 320 is constructed as a linked list as shown in FIG. 3. CSC global data control area 310 stores a Component List pointer which points to a Component Name entry of a table in component control area 320. The table of component control area 320 containing the addressed Component Name entry includes a Load Count entry, a pointer to the next component name, a pointer to a previous component name, and CCA address entry. The CCA address points to a vector in CCA control area 330.

Figure 4:
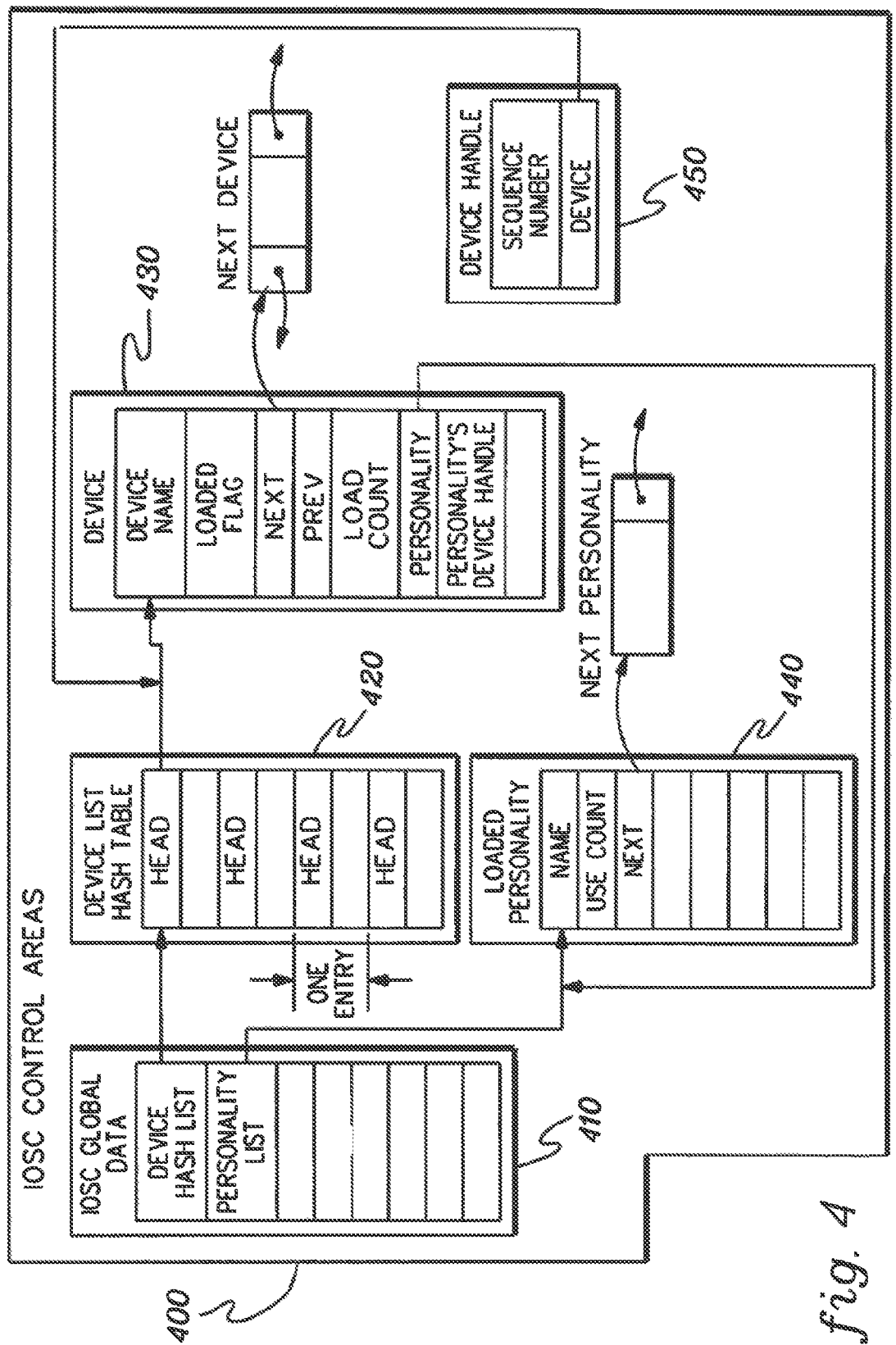
FIG. 4 illustrates one embodiment of the control areas of the input-output services component, in accordance with an aspect of the present invention.

As illustrated in the example of FIG. 4, the IOSC control areas 400 include IOSC global data control area 410, device list hash table 420, device control area 430, loaded personality control area 440, and device handle control area 450. IOSC global data control area 410 stores device hash list pointers and personality list pointers. The device hash list pointers point to the head of an entry for a device in device list hash table 420, and the personality list pointers point to a Name entry in loaded personality control area 440. The head of an entry in device list hash table 420 points to a Device Name entry in device control area 430. Device control area 430 is constructed as a linked list of tables. Each table of device control area 430 includes the following entries: Device Name, Loaded Flag, Next Device pointer, Previous Device pointer, Load Count, Personality pointer, and Personalities Device Handle. The Personality pointer is an address to a Name entry in loaded personality control area 440. Each Name entry in loaded personality control area 440 has a corresponding Use Count entry and a corresponding Next Personality pointer, which points to the next table in the linked list of loaded personality 440. Device handle control area 450 comprises Sequence Number and Device entries. The Device entry of control area 450 points to a Device Name entry of device control area 430.

Figure 5:
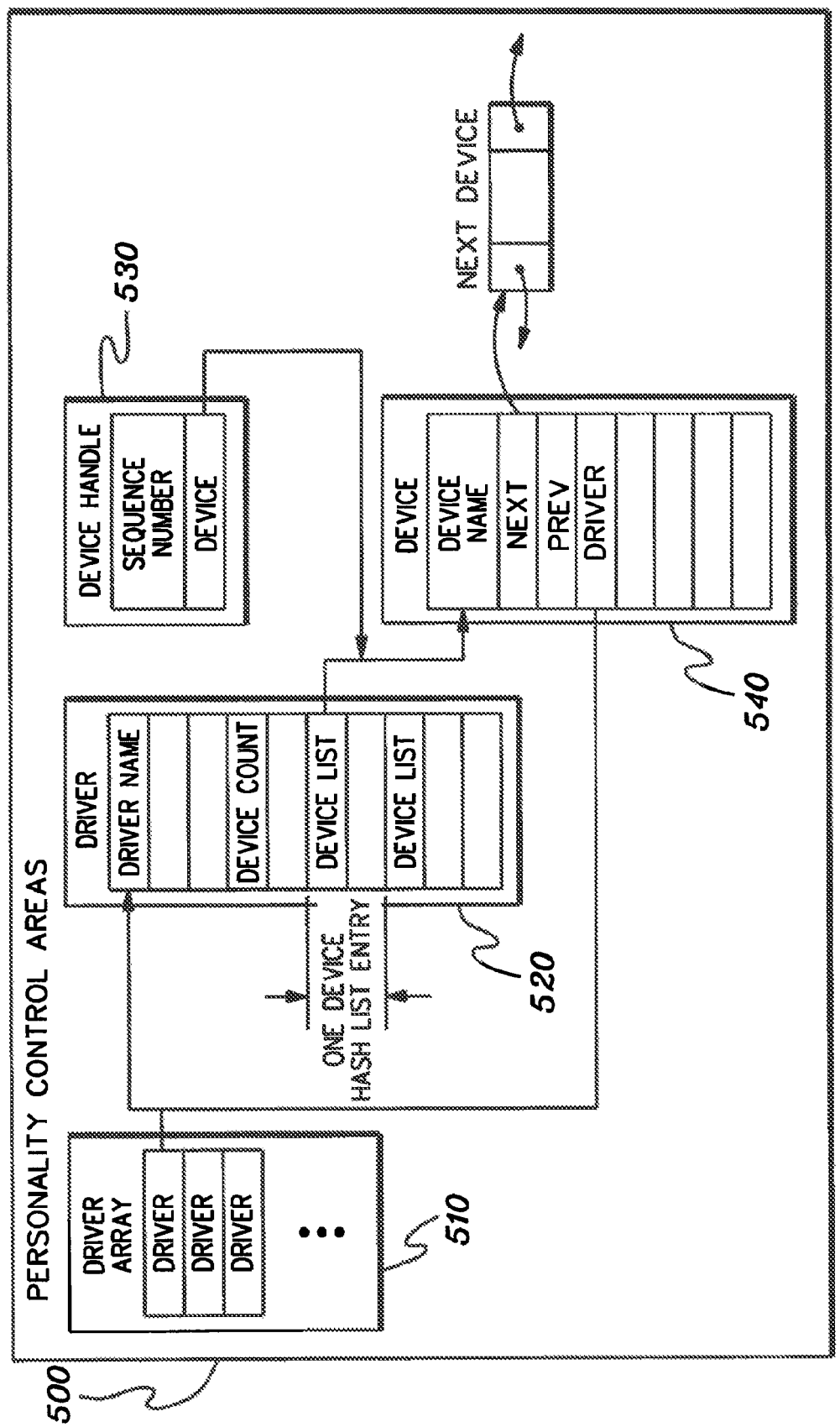
FIG. 5 illustrates one embodiment of the personality control areas, which are associated with the personality components of personality sublayer of the execution environment, in accordance with an aspect of the present invention.

One embodiment of the personality component control areas 500, which are associated with the personality components of personality sublayer 124 in FIG. 1, are illustrated in FIG. 5. Personality component control areas 500 include driver array control area 510, driver control area 520, device handle control area 530, and device control area 540. Driver array control area 510 is a table of Driver pointers, which point to Driver Name entries in driver control area 520. Driver control area 520 stores Driver Name, Device Count, and Device List entries for each loaded device driver module. Each Device List entry of driver control area 520 points to a Device Name entry in device control area 540. Device handle control area 530 comprises a table of Sequence Number and Device entries. A Device entry of device handle control area 530 is a pointer which points to a Device Name entry in device control area 540. Device control area 540 comprises a linked list of tables which have the following entries: Device Name, Next Device, Previous Device, and Driver pointer. A Driver pointer entry of device control area 540 points to a Driver Name entry in driver control area 520. The Next Device and Previous Device entries point to the next device table and previous device tables, respectively, in the linked list.

Further features of the present invention, including the interaction of the components of the execution environment for porting code from native platform to a non-native platform and the use of the control areas of FIGS. 3, 4, and 5, will be become apparent from the following descriptions of the flow diagram embodiments illustrated in FIGS. 6 through 14. These flow diagrams describe exemplary logical flow embodiments of the processing by various components in the layers of the execution environment for functions performed by the execution environment.

Figure 6:
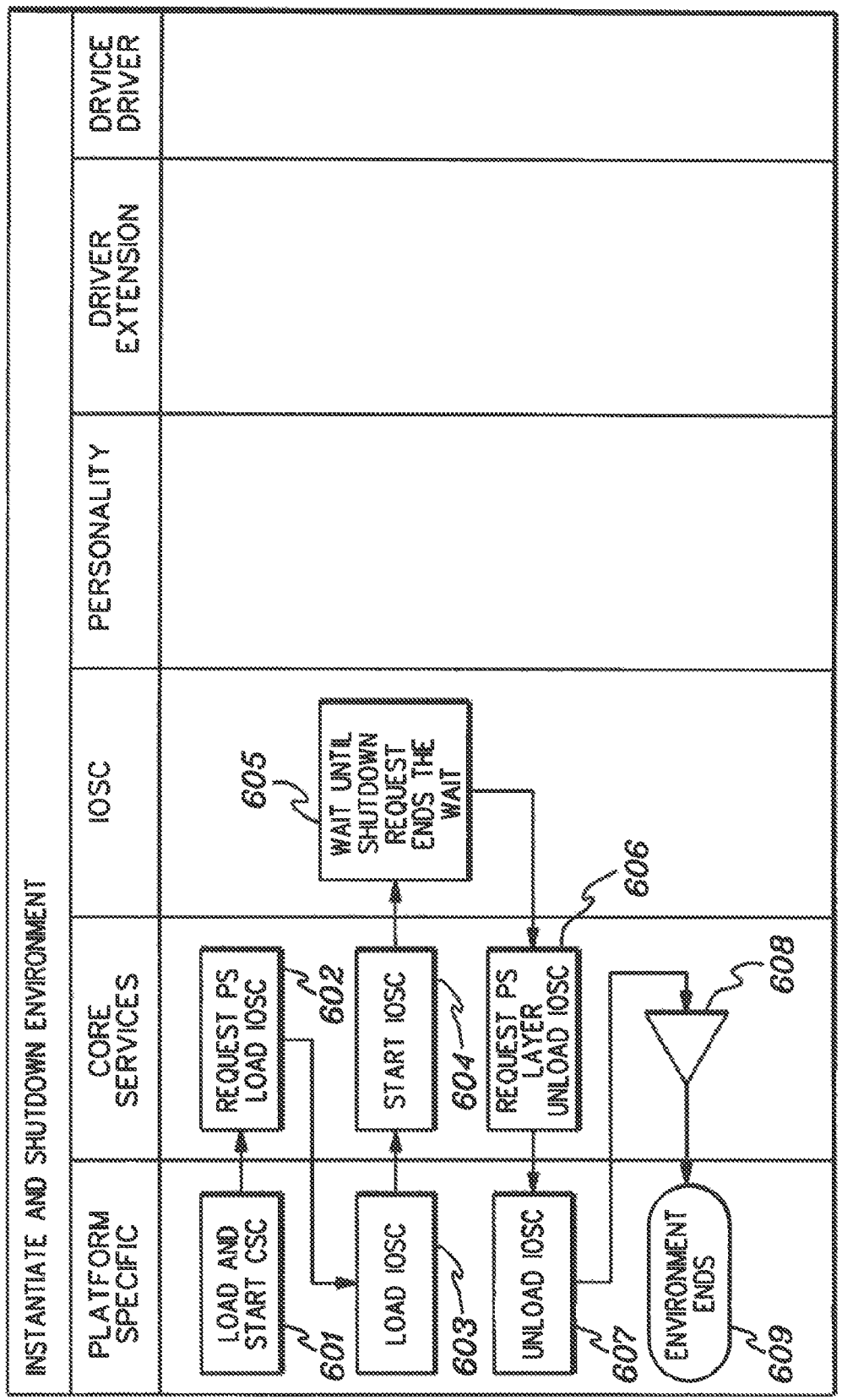
FIG. 6 illustrates one example of a flow diagram of processes for instantiating and terminating the execution environment for porting code, in accordance with an aspect of the present invention.

FIG. 6 illustrates one embodiment of a flow diagram 600 of a process for instantiating and terminating the execution environment for porting code in accordance with an aspect of the present invention. Instantiation of the execution environment begins with the prolog system interface component 211 of the platform-specific layer of FIG. 2 loading the dynamic load library (DLL) for platform-neutral core services component (PNCSC) 213 of FIG. 2 and calling the PNCSC's Start service in step 601. In step 602, the Start service of the PNCSC requests that the platform-specific layer load the IOSC's dynamic load library. The platform-specific layer loads the IOSC DLL in step 603. As part of the mechanism for loading a component's DLL, the DLL initializes and establishes its entry points. When the IOSC's DLL has been loaded, control returns to the PNCSC, and the PNCSC's Start service invokes the Start service of input-output services component (IOSC) 221 of FIG. 2 in step 604. In step 605, the Start service of the IOSC, puts itself to sleep, essentially keeping the IOSC resident and able to receive requests for services. The IOSC remains in this state until it receives a valid Shutdown request, which ends the wait state.

Termination of the execution environment for porting code begins when the IOSC receives a valid Shutdown request. Flow diagram 1400 in FIG. 14, which is described later herein, illustrates one embodiment of how the determination is made to proceed from step 605 to step 606 of the processing illustrated in FIG. 6. The PNCSC's Start service gets control back from the IOSC in step 606, and the PNCSC makes a request to the platform-specific layer to unload the IOSC dynamic load library. In step 607, the platform-specific layer unloads the IOSC DLL in response to this request and returns to the PNCSC. Then, the PNCSC returns to the platform-specific layer in step 608, and in step 609, the prolog system interface component, which started the container environment, gets control back. The prolog system interface component unloads the PNCSC, frees the C-stack, and completes its processing by returning to the process that invoked it.

Figure 7A:
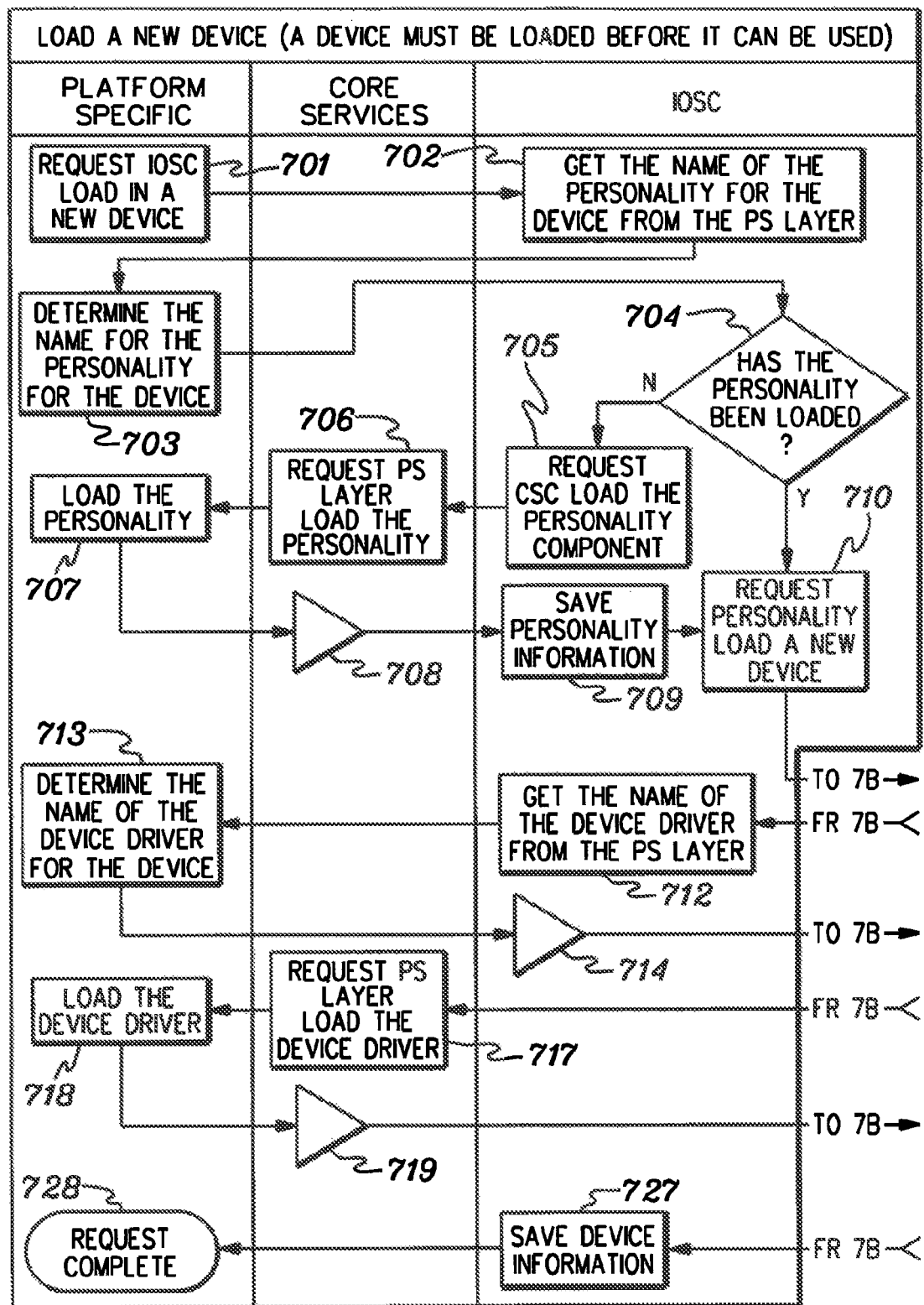
FIGS. 7A and 7B illustrate one example of a flow diagram of a process for loading a device in the execution environment for porting code, in accordance with an aspect of the present invention.
Figure 7B:
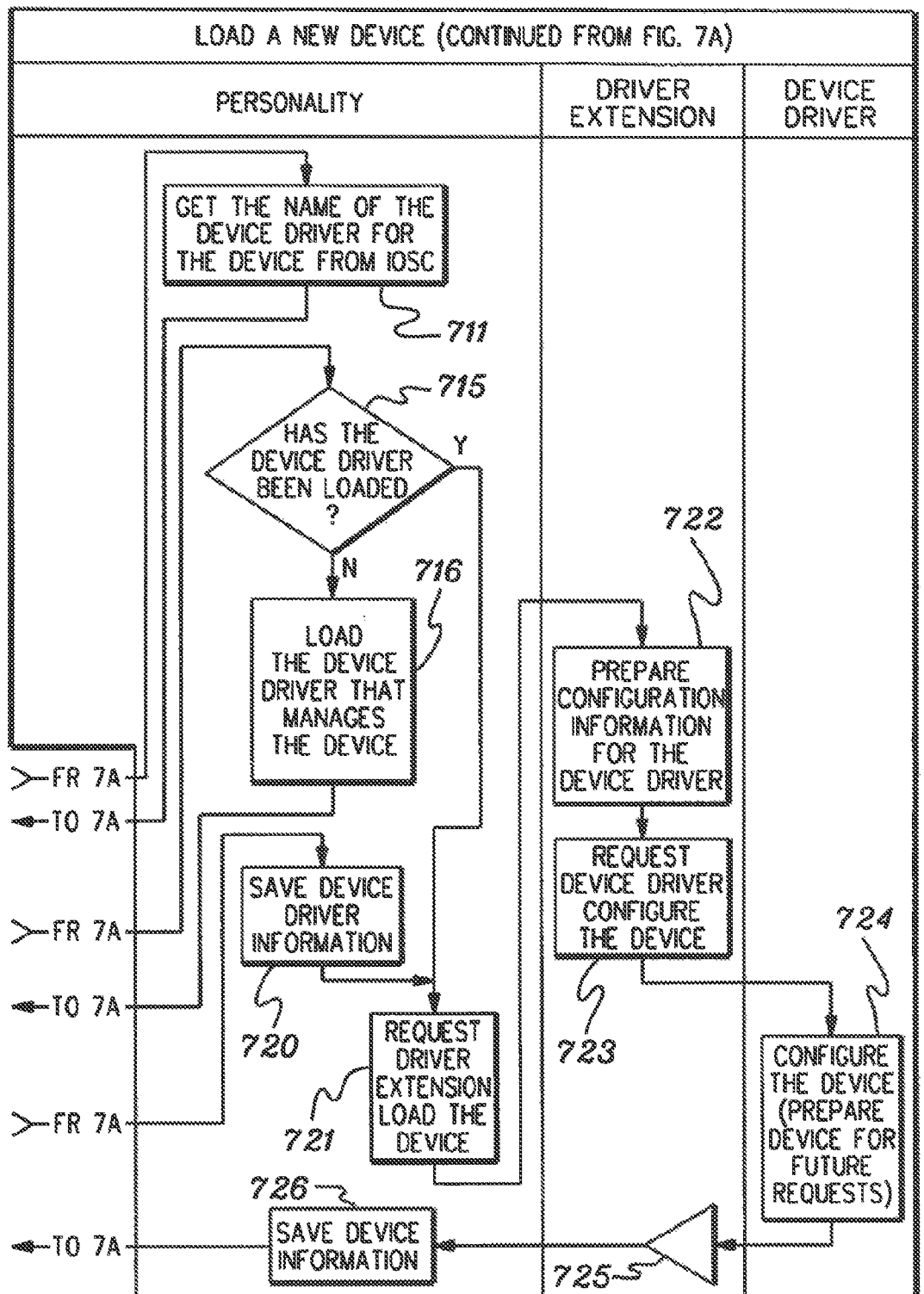

FIGS. 7A and 7B illustrate one flow diagram embodiment 700 of a process for loading a device in the execution environment in accordance with an aspect of the present invention. In the example shown in FIGS. 7A and 7B, the device driver for the device is the code ported from its native platform to a non-native platform. Generally, a ported code module or a component of the execution environment must be loaded before it can be called and run.

The process of loading a device begins with step 701, wherein the platform-specific layer establishes a C-language execution environment (a C-stack) and calls the IOSC's LoadDevice service, requesting the IOSC to load a device. In step 702, the IOSC determines whether this device has already been loaded by searching device list hash table 420. If the IOSC finds the requested device queued to device list hash table 420, the IOSC simply increments the corresponding Load Count entry for the device in device control area 430 and returns control to the calling component of the platform-specific layer. Otherwise, the IOSC's LoadDevice service requests the name of the personality component that supports the device driver for the requested device (step 702). In step 703, the platform-specific layer determines the required personality component in response to the IOSC's request and returns the name of the required personality component to the IOSC. In step 704, the IOSC determines whether the required personality component has been loaded by checking the list of loaded personality components in loaded personality control area 440. If the name of the required supporting personality component is not in the list of loaded personality control area 440, then the IOSC proceeds to step 705; otherwise, the IOSC skips to step 710.

If the required personality component has not been loaded, the IOSC's LoadDevice service makes a request to the PNCSC to load the required personality component by calling the PNCSC's LoadComponent service in step 705. In response, the PNCSC requests that the platform-specific layer load the required personality component's dynamic load library (step 706); the platform-specific layer loads the required personality's DLL and returns to the PNCSC (step 707); and the PNCSC returns to the IOSC (step 708). The IOSC creates loaded personality control area 440, if loaded personality control area 440 does not already exist, and adds the name of the personality component, which was loaded in response to the IOSC's request, to the list of loaded personality components in loaded personality control area 440 (step 709).

Since the personality component which supports the requested device's device driver has been loaded, the IOSC passes the request to load a device on to the required personality component by calling this personality component's LoadDevice service in step 710. In step 711, the personality component requests the name of the device driver that manages the requested device from the IOSC. The IOSC makes a request to the platform-specific layer for the name of the device driver in step 712. The platform-specific layer determines the name of the device driver and returns the information to the IOSC (step 713); the IOSC returns the device driver name to the personality component (step 714). Processing proceeds to step 715, wherein the personality component determines whether the required device driver is loaded. If no Driver entry listed in driver array control area 510 points to a DriverName entry in driver control area 520 matching the required device driver name, the personality component requests that the PNCSC load the required device driver component by calling the PNCSC's LoadComponent service in step 716; otherwise, the processing proceeds to step 721. Proceeding from step 716 to step 717, the PNCSC requests that the platform-specific layer load the required device driver component's DLL. The platform-specific layer loads the required device driver component's DLL in step 718, which also includes a corresponding driver extension component, and returns to the PNCSC. The PNCSC returns to the personality component (step 719). The driver extension component allows the required device driver component, which may not have been written as a DLL to act as one. In step 720, the personality component saves information about the loaded device driver by creating a driver control area 520 and queuing the created driver control area 520 to driver array control area 510.

Next, the personality component requests that the driver extension component load the device in step 721. In step 722, the driver extension component does whatever processing is needed to prepare the device driver for handling the request to load a device. This preparatory processing depends on the device driver requirements, but typically the processing to prepare the device driver includes collecting or creating device configuration information and formatting the configuration information in a way that is understood by the device driver. The driver extension component requests the device driver to configure the device, i.e. prepare the device for use, in step 723. The device driver configures the device and returns to the driver extension component (step 724), and the driver extension component returns to the personality component (step 725).

In step 726, the personality component saves device information; that is, the personality component creates a device handle control area 530 and a device control area 540 and queues the device control area 540 to the driver control area 520. The personality component then returns to the IOSC, passing the content of the personality component's device handle control area 530 to the IOSC. Processing continues with the IOSC saving device information in step 727. In step 727, the IOSC increments the Use Count entry for the personality component in loaded personality control area 440, creates device control area 430 as the IOSC's representation of the device, queues device control area 430 to device list hash table 420, and then returns to the platform-specific layer, passing the IOSC's device handle (device handle control area 450) to the platform-specific layer. Before control is returned to the platform-specific layer in step 727, the Load Count entry in device control area 430 created by the IOSC is set to 1, and the personality component's device handle is saved in the Personality's Device Handle entry of device control area 430. In step 728, the platform-specific layer is informed that the load device request has completed, and the platform-specific layer saves the IOSC's device handle for later use in processing general service requests.

Figure 8:
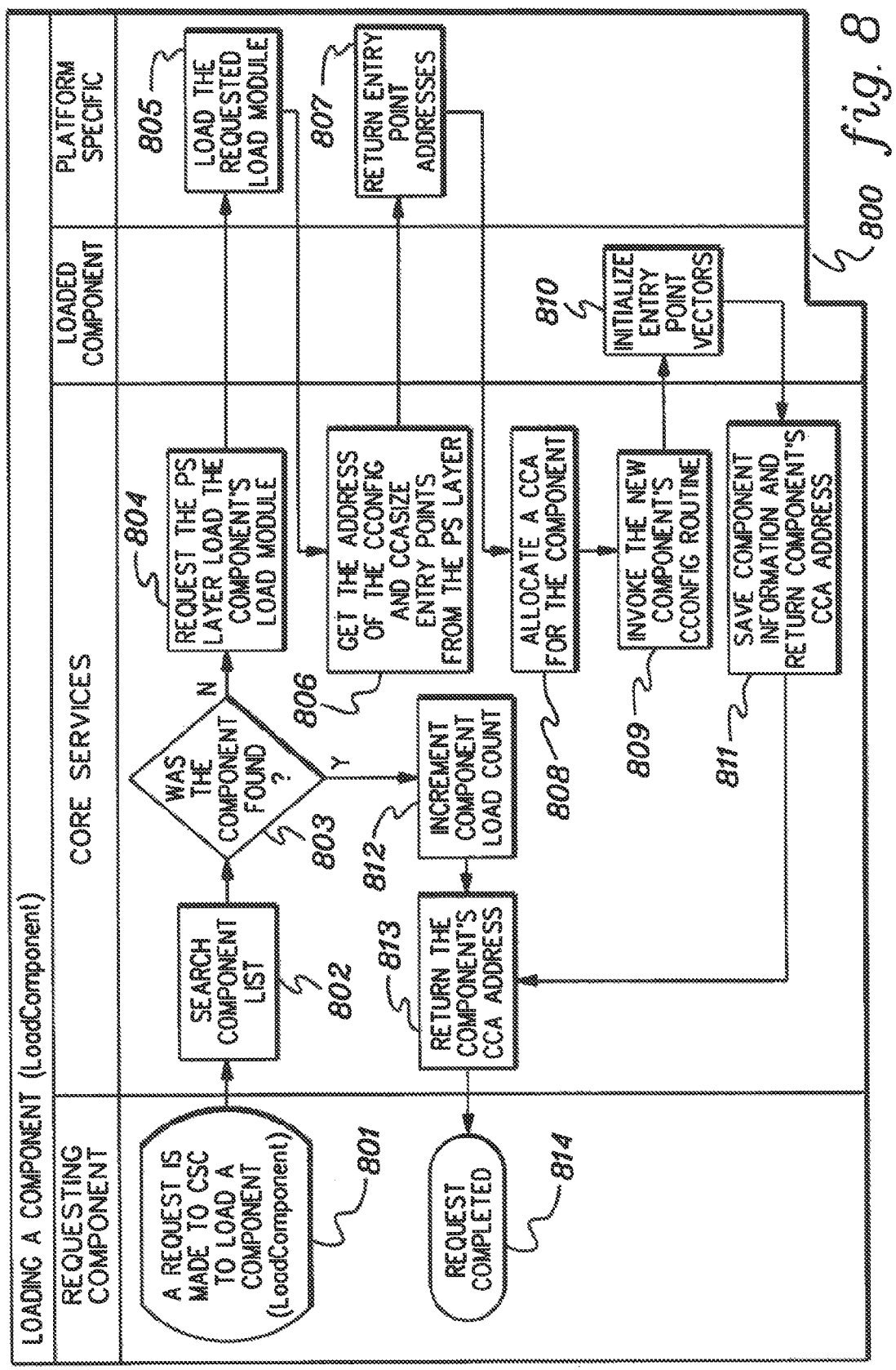
FIG. 8 illustrates one embodiment of a flow diagram for loading a component of the execution environment for porting code, in accordance with an aspect of the present invention.

FIG. 8 illustrates one embodiment of a flow diagram 800 for loading a component of the execution environment in accordance with an aspect of the present invention. When one component of the execution environment requires the services of another component, the component requiring the services makes a request to the PNCSC to load the required component by invoking the LoadComponent service of PNCSC, passing the PNCSC the name of the required component, in step 801. When the PNCSC's LoadComponent service gets control in step 802, the PNCSC's LoadComponent service searches for the name of the required component in the PNCSC's list of component control areas 320 queued to the CSC global data control area 310. In step 803, the processing branches to step 812 if the required component was found in step 802; otherwise, the processing continues with step 804.

In step 804, the PNCSC's LoadComponent service requests that the platform-specific (PS) layer load the required component's load module. The PS layer loads the required component's load module and returns control to the platform-neutral core services component's LoadComponent service in step 805. The PNCSC's LoadComponent service continues in step 806 by requesting the addresses of two entry points in the required component's module from the PS layer. The entry point names are fixed as "cconfig" and "ccasize". Each component must have these two entry points defined as external entries. In response, the PS layer locates the requested entry point names and returns the requested entry point names to the PNCSC's LoadComponent service in step 807. In step 808, the PNCSC's LoadComponent service reads the contents of the memory address "ccasize". The contents of the memory address "ccasize" specify the size of the component control array (CCA) control area 330 needed by the required component. The PNCSC's LoadComponent service then allocates sufficient storage for CCA control area 330 as indicated by the contents of the memory address "ccsasize". In step 809, the PNCSC's LoadComponent service calls the required component's configuration routine at the "cconfig" entry point. The required component's "cconfig" routine does any initialization required by the required component in step 810. The required component's "cconfig" routine also places the address of the service routines provided by the required component into the input CCA control area 330. In step 811, the PNCSC's LoadComponent service creates a component control area 320 for the newly-loaded, required component, setting the Load Count entry to 1 and placing the address of the CCA control area 330 in the CCA Address entry. The processing of step 811 also includes placing the address of the component control area 320 in the CSC global data control area 310. Then, the processing proceeds with step 813.

In step 813, the PNCSC's LoadComponent service passes the address of the required component's CCA control area 330 back to the requesting component and returns control to the requesting component. The request to load the required component is completed in step 814.

If the name of the required component was found in the PNCSC's list of loaded components in component control area 320 in step 803, the processing branched to step 812 as stated above. Since the required component has been loaded already, the PNCSC's LoadComponent service increments the Load Count entry for the required component in component control area 320 in step 812. Then, processing continues with step 813, which was described above.

Figure 9:
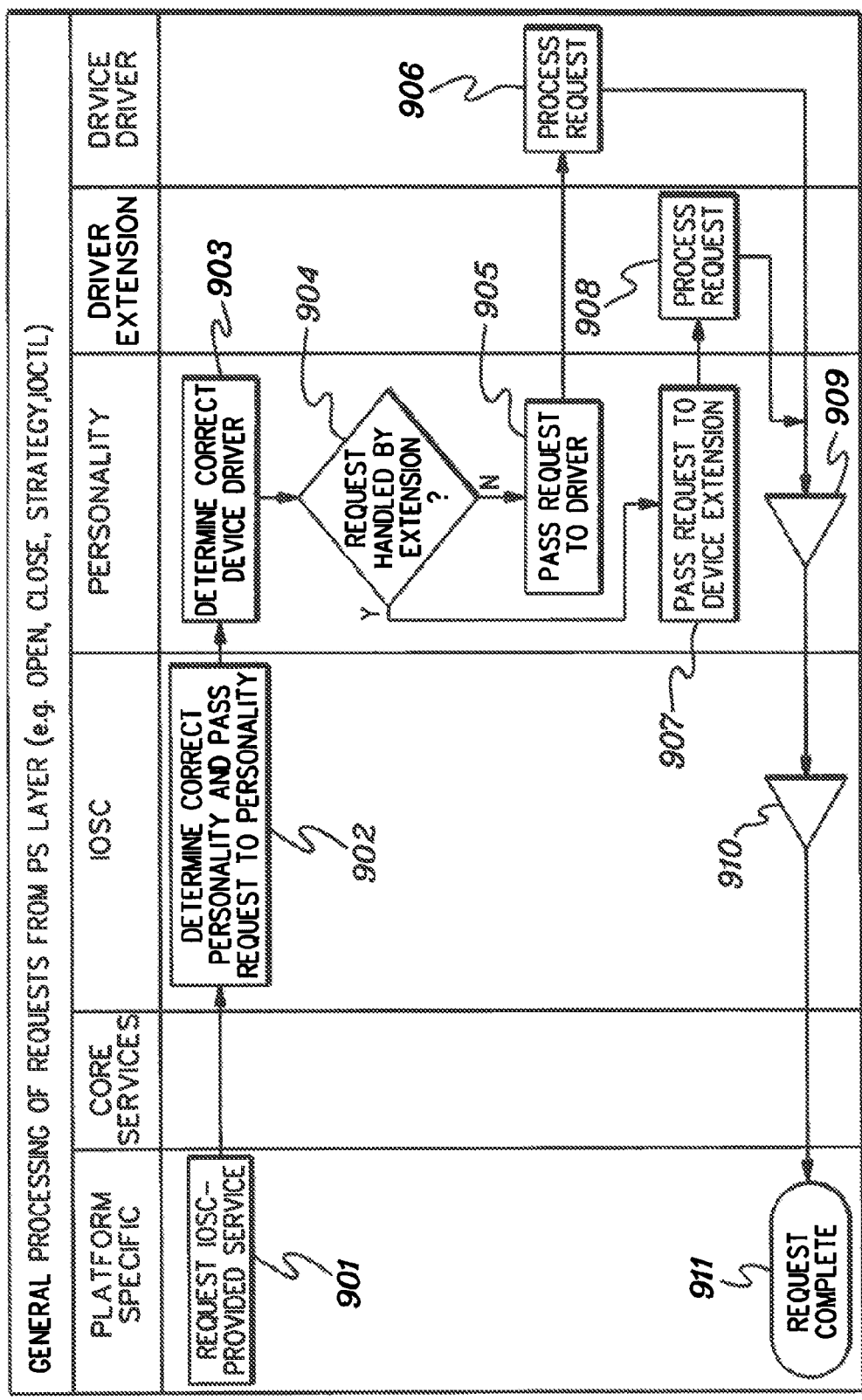
FIG. 9 illustrates one embodiment of a flow diagram for the general processing of requests from the platform-specific layer to the platform-neutral layer of the execution environment for porting code, in accordance with an aspect of the present invention.

Once a device or a component has been loaded, the loaded device or loaded component may be invoked in response to a request by another component in the execution environment. For example, the loaded device or loaded component may be called in response to a request for service from the PS layer. FIG. 9 illustrates one embodiment of a flow diagram 900 for the general processing of requests from the platform-specific layer to the platform-neutral layer in accordance with an aspect of the present invention. In this example, the processing of flow diagram 900 begins with the platform-specific layer making a request to the input-output services component (IOSC) for a service provided by a loaded device in step 901. The PS layer passes the IOSC's device handle for the device to the IOSC when making the request. Virtually all requests for service from the PS layer are requests to access, query, or control devices managed by the device driver, the ported device in this example. The device driver is unaware of the PS layer, and the PS layer is not generally aware of the device driver. Therefore, a request for service from a device is made from the PS layer to IOSC through some service that the IOSC provides for the PS layer. Examples include the Open, Strategy, IOCTL, and Close services of the IOSC.

The processing continues with step 902 in which the IOSC determines the personality corresponding to the requested device's device driver and then passes the PS layer's request for service to the appropriate personality. More particularly, the IOSC uses the device handle, which was passed by the PS layer, to find the requested device's device control area 430. The IOSC then uses the information saved in the device structure to find the corresponding personality structure in loaded personality control area 440. The IOSC passes a copy of the personality's device handle, device handle control area 530, to the personality corresponding to the device driver needed to process the request when passing the request to that personality.

In step 903, the personality invoked uses this device handle to find the corresponding device structure in device control area 540 and uses the Driver entry in the referenced device structure to find the Driver Name entry in driver control area 520. In step 904, the personality determines whether the received request should be routed to the device driver or to the driver extension component based on the device driver's interfaces. If the request for service is to be handled by the device extension component, the request is passed to the driver extension component in step 907. Then, in step 908, the driver extension component processes the request and returns control to the personality component.

Alternatively, if the personality component determines that the device driver handles the request in step 904, the personality component passes the request to the device driver in step 905. In step 906, the device driver processes the request and returns control to the personality component which had passed the request.

After the request is processed, processing continues from step 906 or step 908 with step 909 in which the personality component passes the results of the request back to the IOSC. In step 910, the IOSC passes the results of the request back to the PS layer, which had issued the request to begin the processing illustrated in FIG. 9. In step 911, the PS layer receives the results of the request and the processing of the request is complete.

Figure 10:
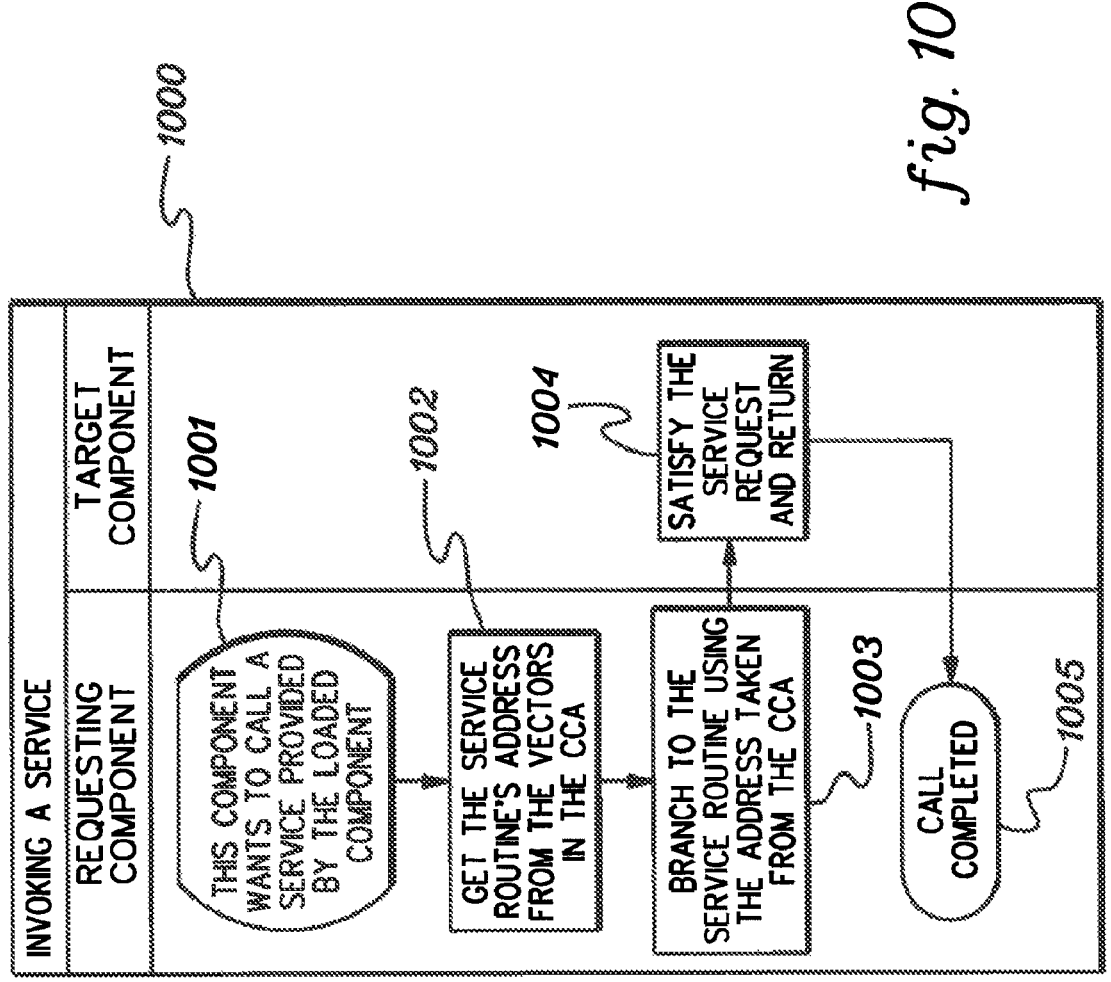
FIG. 10 illustrates one embodiment of a flow diagram for one component in the execution environment invoking a service of another loaded component, in accordance with an aspect of the present invention.

FIG. 10 illustrates one embodiment of a flow diagram 1000 for one component in the execution environment invoking a service of another loaded component in accordance with an aspect of the present invention. The processing of flow diagram 1000 begins with the component requesting the service, i.e. the requesting component, in step 1001. Since the other component's CCA Address was returned to the requesting component on the return of the LoadComponent call previously (step 813) and saved in the requesting component's control areas, in step 1002, the requesting component gets the target service's entry point address from the entry addressed by this CCA Address in the CCA control area 330. CCA control area 330 comprises an array of entry point addresses. The requesting component needs to know the location in this array of the target service's entry point address. This location is provided in the public header files of the target component, i.e. the component to be invoked to obtain the target service. The processing continues with step 1003 in which the requesting component calls the target service of the target component. In step 1004, the target service processes the request and returns to the requesting component. The processing completes in step 1005.

Figure 11:
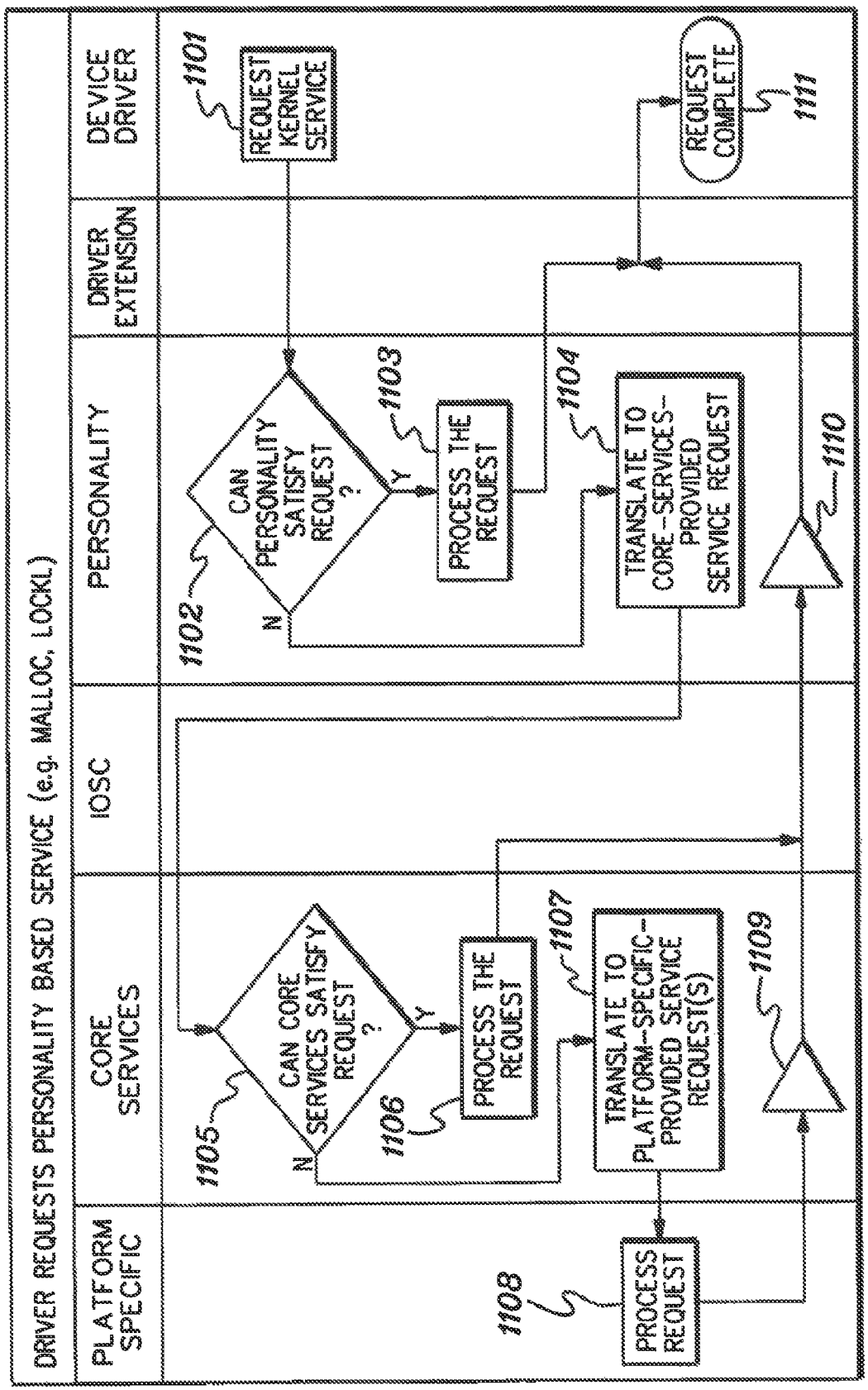
FIG. 11 illustrates one embodiment of a flow diagram for the processing of a request made by a ported device driver for a personality-component-based service, in accordance with an aspect of the present invention.

FIG. 11 illustrates one embodiment of a flow diagram 1100 for the processing of a request made by a ported device driver for a personality-based service in accordance with an aspect of the present invention. The processing begins in step 1101 with the device driver requesting a kernel service of the device driver's native platform. Since the device driver is actually executing in an environment provided by a personality component, which substantially emulates the native platform of the device driver by providing the native platform services utilized by the device driver, a call by the device driver for a service of the device driver's native platform is actually directed to that personality component. For example, the platform services expected by a device driver ported from a UNIX platform include malloc (get memory space) and lockl (get a lock).

Processing continues with step 1002 in which the invoked personality component determines whether the invoked personality can satisfy the request itself or whether the personality component must invoke the platform-neutral core services component (PNCSC) to satisfy the request for service. For example, if the request is to invoke another device driver which is supported by the invoked personality, the invoked personality, as the device driver manager for the other device driver can satisfy the request. In another example, such as a request for a lock, the personality component is dependent on the PNCSC to satisfy the request. If the device driver's request can be satisfied by the invoked personality, then processing continues with step 1103; otherwise, processing continues with step 1104.

Continuing with step 1103, the invoked personality component satisfies the request from the device driver and returns to the device driver. The device driver's request is completed in step 1111.

Alternatively, if the determination in step 1102 is that the device driver's request cannot be satisfied by the invoked personality component, then the personality component translates the device driver's request into one or more services provided by the PNCSC and requests the required service or services from the PNCSC in step 1104. In step 1105, the PNCSC determines whether the PNCSC can satisfy the request itself or whether the PNCSC must invoke a component of the platform-specific layer to satisfy the translated request from the invoked personality component. If the PNCSC can satisfy the request itself, processing continues with step 1106, in which the PNCSC satisfies the request and returns to the personality.

Alternatively, if the determination in step 1105 is that the PNCSC cannot satisfy the request itself, the processing proceeds instead to step 1107. In step 1107, the PNCSC determines the service or services needed from the platform-specific layer to satisfy the request from the personality component, and the PNCSC calls the needed service or services of the platform-specific layer. In step 1108, the platform-specific layer processes the request or requests for service from the PNCSC and returns to the PNCSC. The PNCSC in turn returns to the personality in step 1109. The processing paths from step 1106 and step 1109 merge with the return to the personality component. Then, in step 1110, the personality component returns to the device driver, and the device driver's request is completed in step 1111.

Figure 12A:
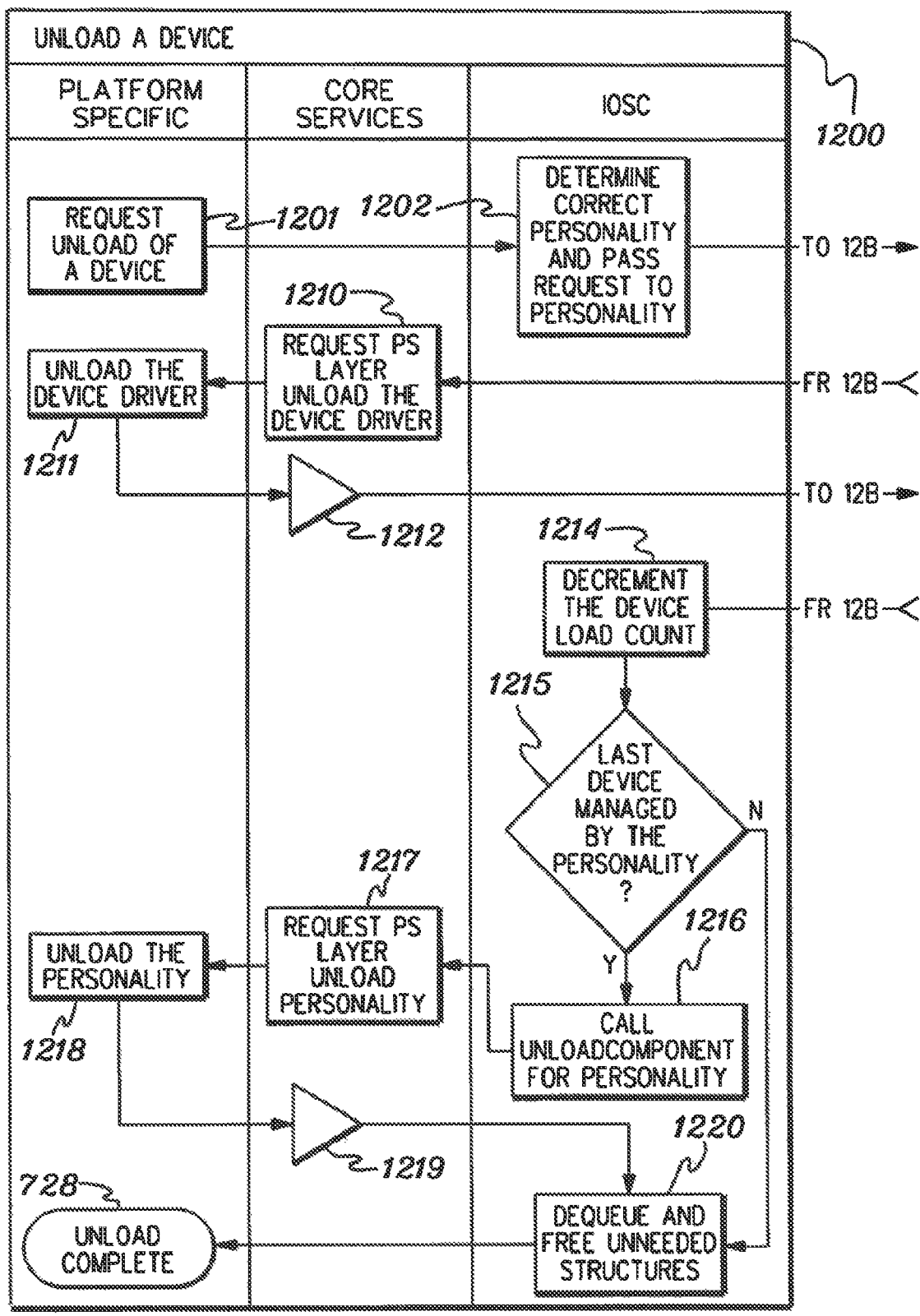
FIGS. 12A and 12B illustrate one embodiment of a flow diagram of a process for unloading a device in the execution environment for porting code, in accordance with an aspect of the present invention.
Figure 12B:
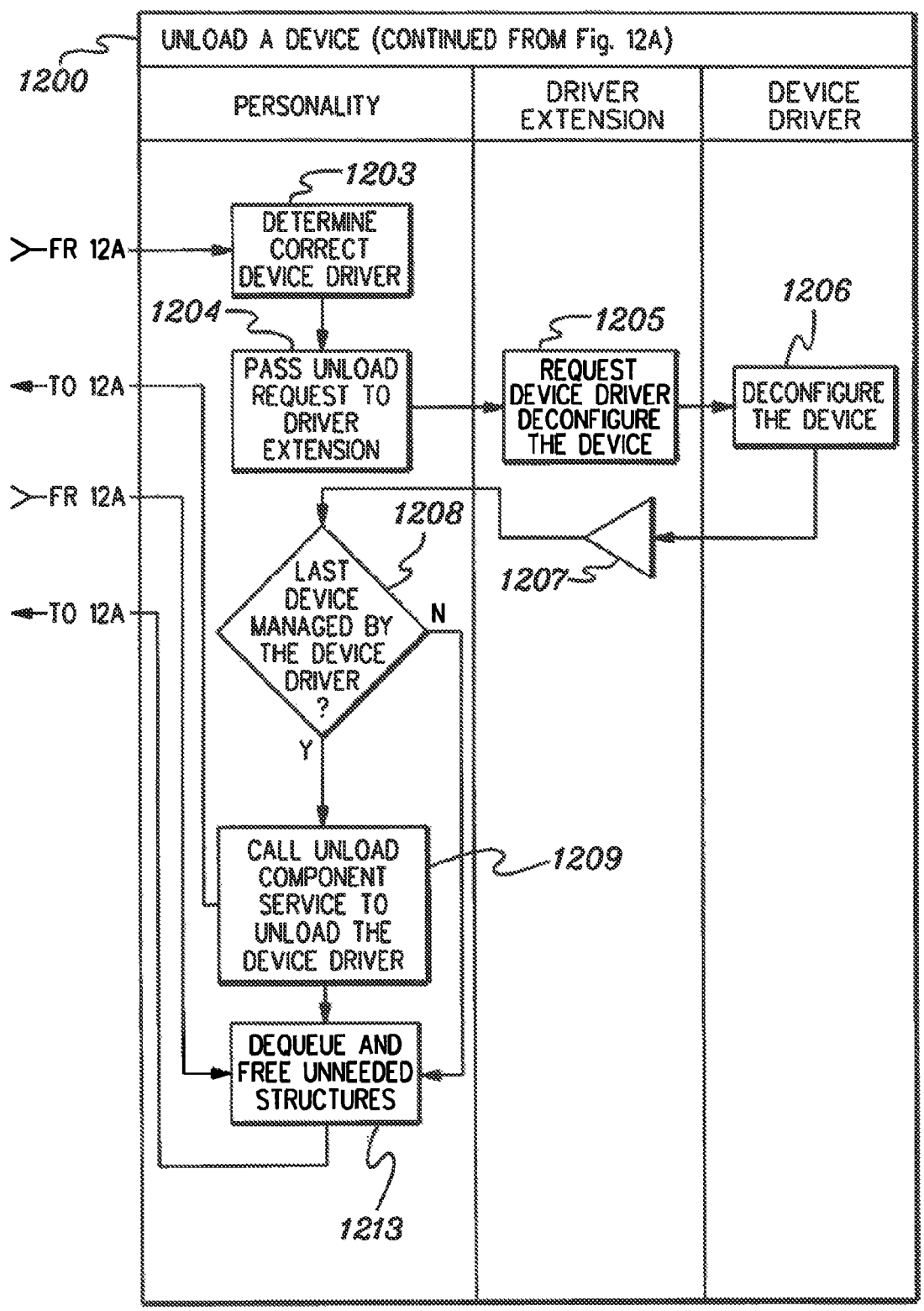

FIGS. 12A and 12B illustrate one embodiment of a flow diagram 1200 of a process for unloading a device in the execution environment in accordance with an aspect of the present invention. In the example shown in FIGS. 12A and 12B, the device driver is the code ported from its native platform to a non-native platform. Generally, a ported code module or a component of the execution environment is unloaded when the ported code module or component is not currently needed to process an outstanding request for service.

The process of unloading a device begins with step 1201, wherein the PS layer requests that the IOSC unload the device. In making the request to unload the device, the PS layer passes the device handle for the device to the IOSC. In step 1202, the IOSC uses the device handle passed by the PS layer to find the device structure in device control area 430. The IOSC then uses the information saved in the addressed device structure to locate the corresponding personality structure in loaded personality control area 440 and passes the request to unload the device on to the corresponding personality component. The IOSC passes the personality's device handle in the Personality's Device Handle entry of device control area 430 to the personality component in the request to unload the device. The corresponding personality component addressed is the personality component which supports the target device's driver.

The corresponding personality component processes the IOSC's request to unload the device beginning in step 1203. The personality component determines the device driver for the device to be unloaded by using the device handle received from the IOSC to find the personality component's device structure in device control area 540 and using the information in the Driver entry of this addressed device structure to find the driver structure in driver control area 520. In step 1204, the personality component makes a request to the appropriate driver extension component to unload the device. Depending on the characteristics of the device driver, the driver extension component may also perform ancillary processing in conjunction with processing the request to unload the device. In step 1205, the driver extension component requests that the device driver deconfigure the device to be unloaded. The device driver responds to the driver extension component's request by deconfiguring the device in step 1206 and returning to the calling device driver extension component. In step 1207, the device driver extension returns to the calling personality component.

The personality component supporting the device to be unloaded continues processing the request to unload the device in step 1208, in which this personality component determines whether the target device of the unload request is the last device managed by the corresponding device driver. The personality component makes this determination by examining driver control area 520. If the removal of this device from the list of devices in driver control area 520 would result in the list becoming empty, the device driver currently has no more devices to manage, and the processing proceeds to step 1209; otherwise the processing proceeds to step 1213.

Continuing with step 1209, the personality component requests that the PNCSC unload the device driver for the target device by calling the PNCSC's UnloadComponent service because the target device is the last device managed by the device driver. In step 1210, the PNCSC requests that the PS layer unload the device driver for the target device. The platform-specific layer unloads the device driver and returns to the PNCSC in step 1211. In step 1212, the platform-neutral core services component returns to the calling personality component. At step 1213, the two processing paths out of step 1208 merge.

In step 1213, the personality component dequeues the device structure in device control area 540 and frees the memory used to store the device structure of the unloaded device. In addition, if the device driver was unloaded, the personality component also frees the driver structure in driver control area 520 and makes the corresponding Driver entry in driver array control area 510 available for reuse. Then, the personality component returns to the IOSC.

In step 1214, the IOSC continues the processing. The IOSC decrements the Load Count entry in device control area 430 and, if the Load Count is zero, the IOSC decrements the personality Use Count entry in loaded personality control area 440. In step 1215, the IOSC determines whether the unloaded device driver was the last component managed by the corresponding personality component; the IOSC makes this determination based on the value of the personality Use Count entry in loaded personality control area 440. If the personality Use Count is now zero, the unloaded device driver was the last component managed by the personality component, and the processing continues with step 1216; otherwise, the processing proceeds to step 1220.

Continuing with step 1216, the personality component calls the PNCSC's UnloadComponent service to unload the personality component. In step 1217, the PNCSC responds by invoking a PS layer service to unload the personality component. The PS layer unloads the personality identified in the request and returns to the PNCSC in step 1218. The PNCSC returns to the IOSC in step 1219. In step 1220, the two processing paths from step 1215 merge. In step 1220, if the device Load Count is zero in device control area 430, the IOSC dequeues and frees the device structure in device control area 430. Also, if the personality Use Count in loaded personality control area 440 is zero, then the IOSC dequeues and frees the loaded personality control area 440. The IOSC then returns to the PS layer. The request to unload the device is complete in step 1221.

Figure 13:
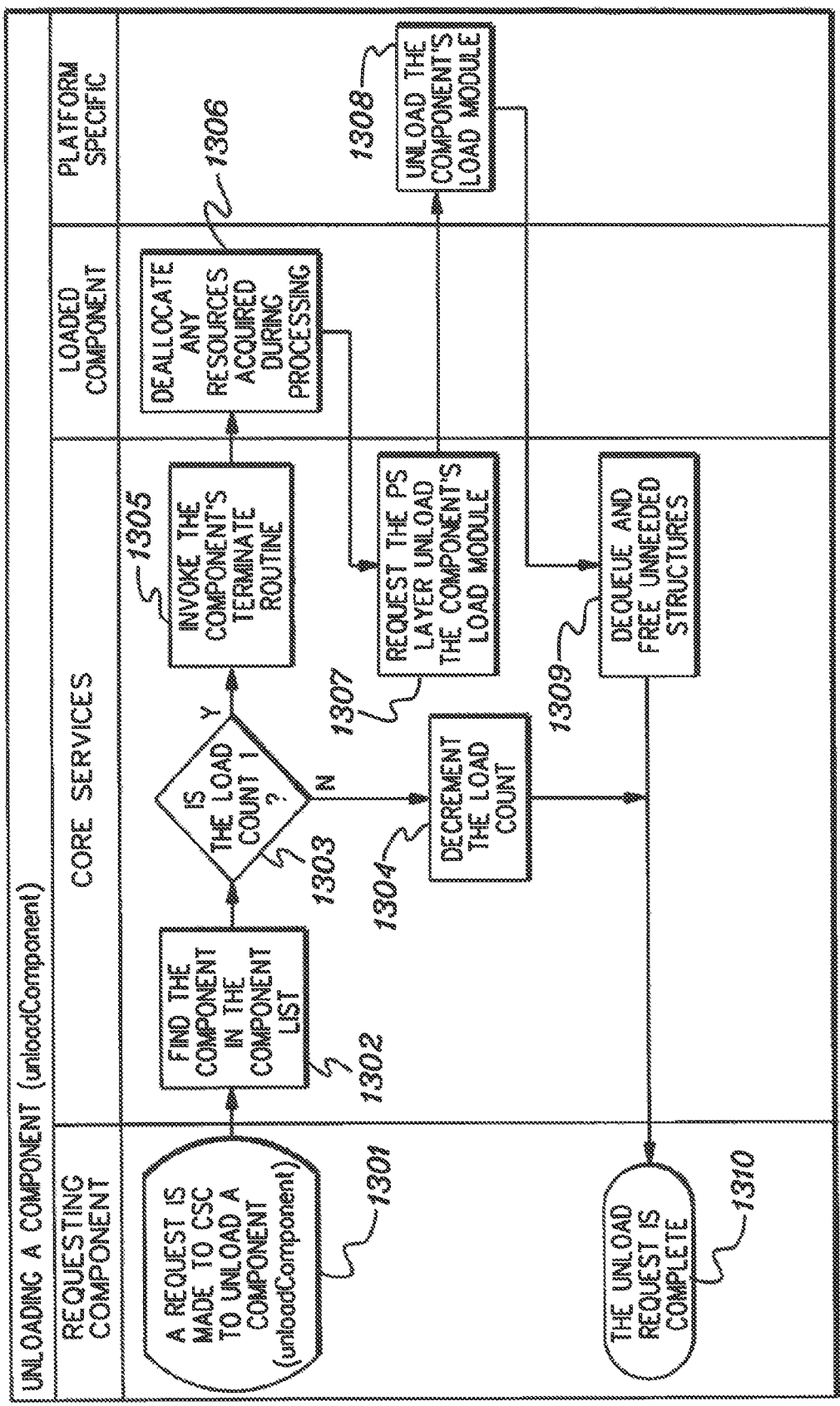
FIG. 13 illustrates one embodiment of a flow diagram for unloading a component of the execution environment, in accordance with an aspect of the present invention.

FIG. 13 illustrates one embodiment of a flow diagram 1300 for unloading a component of the execution environment in more detail in accordance with an aspect of the present invention. When one component of the execution environment currently has no further need for the services of another loaded component, the component which had called the services of the previously-invoked component makes a request to the platform-neutral core services component (PNCSC) to unload the previously-invoked component in step 1301. More particularly, the component which requests that the previously-invoked component be unloaded calls the UnloadComponent service of the PNCSC, passing the PNCSC the name of the component to unload.

In step 1302, the PNCSC's UnloadComponent service searches the PNCSC's list of components in component control area 320 for the target component to be unloaded. A caller error occurs if the target component cannot be found in component control area 320. Otherwise, the PNCSC determines whether any other components currently need services provided by the target component in step 1303. If the Load Count entry for the target component in component control area 320 is greater than 1, the target component is currently needed by at least one other component, and the processing branches to step 1304. In step 1304, the UnloadComponent service of PNCSC decrements the Load Count entry and returns to the calling component. The UnloadComponent request is complete in step 1310.

Alternatively, if the PNCSC determines that the target component is not currently needed by another component in step 1303, i.e., the Load Count entry for the target component in component control area 320 is equal to 1, the processing continues instead with step 1305. In step 1305, the PNCSC's UnloadComponent service invokes the component being unloaded at the target component's "terminate" entry point to invoke the target component's termination routine. The termination service of the target component frees any resources acquired during prior processing in step 1306 and then returns. Resources freed by the target component include memory used to save control blocks of the target component, for example.

The processing continues with step 1307, in which the PNCSC's UnloadComponent service requests that the PS layer unload the target component's load module. In step 1308, the PS layer unloads the target component's load module and returns to the PNCSC. The PNCSC's UnloadComponent service dequeues the target component's structure in the component control area 320 and frees the memory used to store the target component's structure in step 1309. The PNCSC's UnloadComponent service also frees the memory used to store the CCA control area 330 and then returns to the calling component in step 1309. The UnloadComponent request is complete in step 1310.

Figure 14:
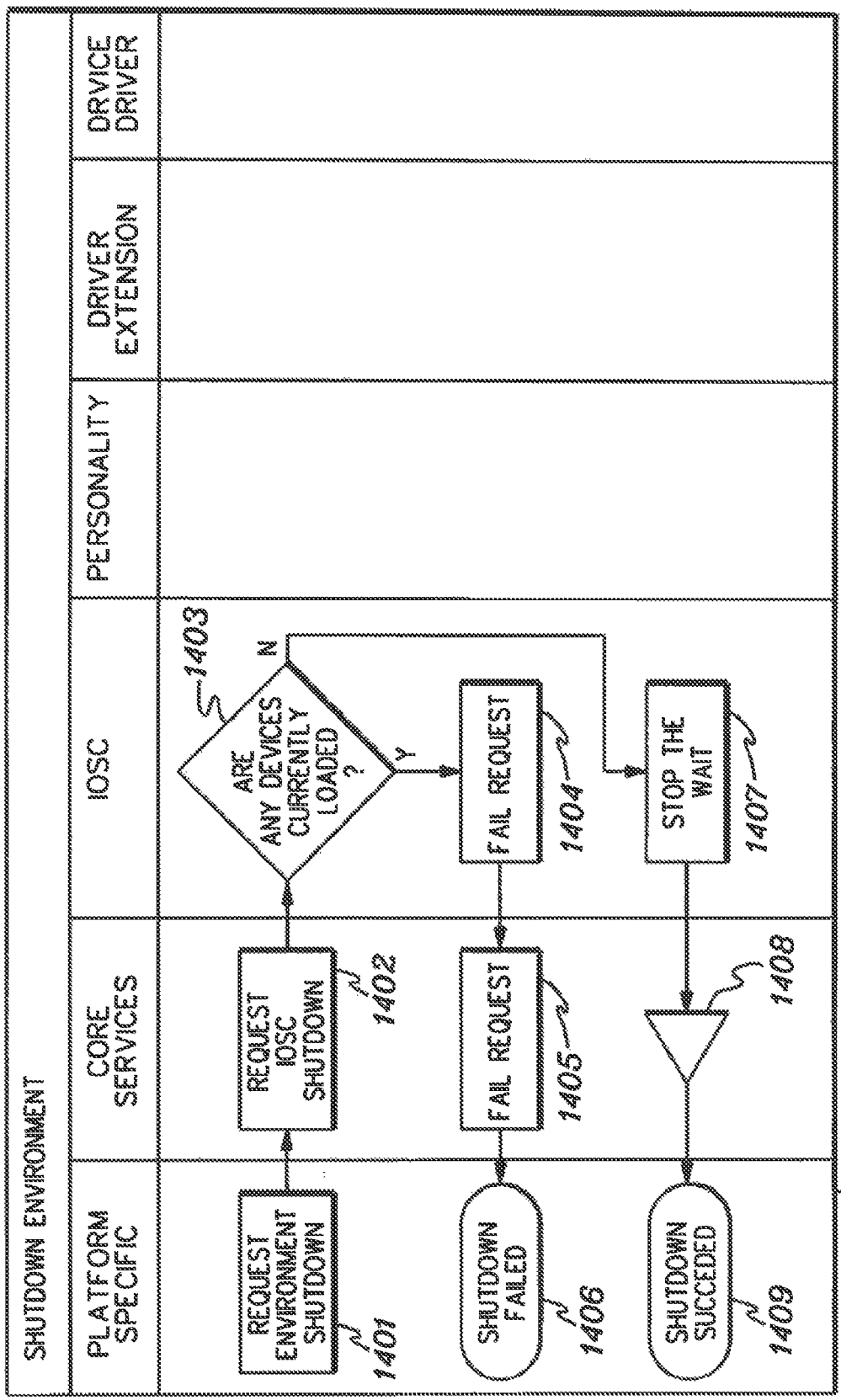
FIG. 14 illustrates one embodiment of a flow diagram which further characterizes shutting down the execution environment for porting code, in accordance with an aspect of the present invention.

FIG. 14 illustrates one embodiment of a flow diagram 1400 which further characterizes shutting down the execution environment for porting code to a non-native platform in accordance with an aspect of the present invention. When a component in the PS layer determines that the execution environment should be shut down, the PS layer component calls the PNCSC's Shutdown service in step 1401. In step 1402, the PNCSC's Shutdown service calls the IOSC's Shutdown service. When the IOSC's Shutdown service is invoked, the IOSC's Shutdown service examines the IOSC's device list hash table 420 to determine whether device list hash table 420 is empty, meaning that no devices are loaded currently, in step 1403. If no devices are loaded, the processing continues with step 1407.

Since no devices are loaded currently, the IOSC has no more responsibilities so the IOSC's Shutdown service wakes the IOSC's Start routine from its wait state and returns to the PNCSC in step 1407. In step 1408, the PNCSC's Shutdown service returns to its caller, the PS layer which requested the shut-down of the execution environment. This requesting PS layer component is informed that the shutdown of the execution environments is complete in step 1409.

Alternatively, in step 1403, if the IOSC's Shutdown service determines that one or more devices are currently loaded, then processing continues instead with step 1404. Since there are still devices loaded, the execution environment cannot shutdown. Consequently, the IOSC returns to its caller, the PNCSC, indicating that the request to shutdown the environment could not be completed. When the PNCSC is informed that the IOSC cannot complete the shutdown request, the PNCSC returns to the calling component of the PS layer in step 1405, indicating that the request could not be completed. In step 1406, the PS layer is informed that the requested shutdown cannot complete.

Examples of IBM® non-native platforms to which code may be ported, in accordance with the present invention, include the z/OS®, z/VM®, TPF, and VSE™ operating systems for zSeries® computing systems. (IBM®, z/OS®, z/VM®, and zSeries® are registered trademarks of International Business Machines Corporation. VSE™ is a common law trademark of International Business Machines Corporation.) However, the scope of the present invention is not limited to such platforms. The present invention can be used to port code to any non-native platform.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system for porting code from a native platform to a non-native platform, the system comprising:
   a computer comprising, a processor, and a non-native, platform-specific layer for interfacing to a non-native platform;
   a portable, layered execution environment comprising:
      a platform-neutral layer, the platform-neutral layer substantially emulating a native platform of the ported code and providing the non-native, platform-specific layer with a platform-neutral interface to the ported code layer, wherein the platform-neutral layer comprises a platform-neutral services-and-interfaces sublayer and a personality sublayer, the platform-neutral services-and-interfaces sublayer defining a set of services available to components of the platform-neutral layer, and the personality sublayer translating requests for services from the platform-neutral services-and-interfaces sublayer to the ported code and translating requests for services from the ported code to the platform-neutral services-and-interfaces sublayer, the ported code being executable on the native platform, the platform-neutral layer being separate from the non-native, platform-specific layer and separate from the ported code layer; and
   wherein the platform-neutral layer and the ported code layer define the portable, layered execution environment and the non-native, platform-specific layer facilitates execution of the portable, layered execution environment on the non-native platform of the computer and interfaces to the non-native platform.

2. The system of claim 1, wherein the platform-neutral services-and-interfaces sublayer comprises a platform-neutral core services component, the platform-neutral core services component defining a set of common services available to other components of the platform-neutral layer.

3. The system of claim 2, wherein the non-native, platform-specific layer comprises a platform-specific core services component, the platform-specific core services component providing an interface between the platform-neutral core services component and the non-native platform to facilitate access to services of the non-native platform by the platform-neutral core services component.

4. The system of claim 2, wherein the platform-neutral services-and-interfaces sublayer further comprises at least one other component, the at least one other component providing an additional service, wherein the additional service may be invoked by a calling component in the platform-neutral layer.

5. The system of claim 4, wherein the at least one other component comprises a primary component, the primary component further providing an interface between the non-native, platform-specific layer and the platform-neutral layer to facilitate access, by the non-native platform, to services provided by the platform-neutral layer in addition to the set of common services defined by the platform-neutral core services component.

6. The system of claim 5, wherein the primary component comprises an input-output services component to facilitate access to input-output services.

7. The system of claim 1, wherein the ported core comprises at least one device driver.

8. The system of claim 1, wherein the system further comprises a customized platform-specific layer for facilitating porting of the portable, layered execution environment to another non-native platform wherein the customized platform-specific layer is adapted to the another non-native platform, and the platform-neutral layer provides the customized platform-specific layer with a platform-neutral interface to the ported code.

9. The system of claim 1, wherein the system further comprises means for constructing an execution environment for porting code from the native platform to the non-native platform, the means for constructing an execution environment comprising: means for instantiating the execution environment comprising the non-native, platform-specific layer and the platform-neutral layer, wherein the platform-neutral layer initially comprises a platform-neutral core services component and a primary component; and means for dynamically loading additional components of the platform-neutral layer as required to satisfy requests for services, the services being provided by the additional components, wherein control areas in memory are utilized to convey information between one component of the platform-neutral layer and another component of the platform-neutral layer, the one component and the another component each being one of the platform-neutral core services component, the primary component, and the additional components.

10. The system of claim 9, wherein the control areas in memory store data and pointers to other data, the data and the pointers being used by a requesting component of the platform-neutral layer to determine a subsequent component to call in making a request for a service provided by the subsequent component, the requesting component and the subsequent component each being one of the platform-neutral core services component, the primary component, and the additional components.

11. The system of claim 1, wherein the ported code operates as a kernel extension of the non-native platform.

12. The system of claim 11, wherein: the ported code comprises at least one device driver; and the non-native, platform-specific layer, the platform-neutral layer, and the device driver operate as an input-output stack.

13. The system of claim 12, wherein the platform-neutral layer further comprises a driver extension module, the driver extension module constructing a load library for a device driver of the at least one device driver and configuring a device to be managed by the device driver.

14. The system of claim 1, wherein: the platform-neutral layer further comprises at least one other personality component to facilitate porting as least one other code module from at least one other native platform to the non-native platform, wherein one of the at least one other code module is executable on a corresponding one of the at least one other native platform; and one of the at least one other personality component substantially emulates the corresponding one of the at least one other native platform and provides the non-native, platform-specific layer with a platform-neutral interface to the at least one other code module.

15. At least one program storage device readable by a machine having recorded thereon at least one program of instructions executable by the machine to perform a method of porting code from a native platform to a non-native platform, the method comprising providing a non-native, platform-specific layer for interfacing to a non-native platform;

providing a portable, layered execution environment including: providing a platform-neutral layer and a ported code layer, the platform-neutral layer substantially emulating a native platform of the ported code and providing the non-native, platform-specific layer with a platform-neutral interface to the ported code layer wherein the platform-neutral layer comprises a platform-neutral services-and-interfaces sublayer and a personality sublayer, the platform-neutral services and interfaces sublayer defining a set of services available to components of the platform-neutral layer, and the personality sublayer translating request for services from the platform-neutral services and interfaces sublayer to the ported code and translating requests for services from the ported code to the platform-neutral services-and-interfaces sublayer, the ported code layer being executable on the native platform, the platform-neutral layer being separate from the non-native, platform-specific layer and separate from the ported code layer; and wherein the platform-neutral layer and the ported code layer define the portable, layered execution environment for facilitating, and the non-native, platform-specific layer facilitates execution of the portable, layered execution environment on the non-native platform and interfaces to an operating system of the non-native platform.

16. The at least one program storage device of claim 15, wherein the platform-neutral services-and-interfaces sublayer comprises a platform-neutral core services component, the platform-neutral core services component defining a set of common services available to other components of the platform-neutral layer.

17. The at least one program storage device of claim 15, wherein the ported code comprises at least one device driver.

18. The at least one program storage device of claim 15, wherein the method further comprises porting the portable, layered execution environment to another non-native platform by providing a customized platform-specific layer for the another non-native platform to replace the non-native, platform-specific layer, wherein the customized platform-specific layer is adapted to the another non-native platform, and the platform-neutral layer provides the customized platform-specific layer with a platform-neutral interface to the ported code.

19. The at least one program storage device of claim 15, wherein the method further comprises constructing an execution environment for the porting code from the native platform to the non-native platform, the constructing comprising: instantiating the execution environment comprising the non-native, platform-specific layer and the platform-neutral layer, wherein the platform-neutral layer initially comprises a platform-neutral core services component and a primary component; and dynamically loading additional components of the platform-neutral layer as required to satisfy requests for services, the services being provided by the additional components, wherein control areas in memory are utilized to convey information between one component of the platform-neutral layer and the another component of the platform-neutral layer, the one component and the another component each being one of the platform-neutral core services component, the primary component, and the additional components.

20. The at least one program storage device of claim 15, wherein the ported code operates as a kernel extension of the non-native platform.

* * * * *